United States Patent [19]

Han

[11] Patent Number: 5,500,847
[45] Date of Patent: Mar. 19, 1996

[54] PICKUP CARRIAGE FEEDING APPARATUS OF A DISC PLAYER

[75] Inventor: Kwangsik Han, Seoul, Rep. of Korea

[73] Assignee: Daewoo Electronics Co., Ltd., Seoul, Rep. of Korea

[21] Appl. No.: 173,101

[22] Filed: Dec. 27, 1993

[30] Foreign Application Priority Data

Dec. 31, 1992 [KR] Rep. of Korea ............ 92-28269

[51] Int. Cl.⁶ ............................................. G11B 21/02
[52] U.S. Cl. ................................................. 369/219
[58] Field of Search .............................. 369/219, 215, 369/220, 223, 226; 360/82, 105, 106, 107

[56] References Cited

U.S. PATENT DOCUMENTS

| | | | |
|---|---|---|---|
| 4,513,409 | 4/1985 | Staar | 369/77.1 |
| 4,514,837 | 4/1985 | Van Rosmalen | 369/219 |
| 4,523,306 | 6/1985 | Staar | 369/77.1 |
| 4,592,040 | 5/1986 | Ohsaki | 369/77.1 |
| 4,617,655 | 10/1986 | Aldenhoven | 369/291 |
| 4,625,304 | 11/1986 | Kanamaru et al. | 369/75.2 |
| 4,627,037 | 12/1986 | Lamaru et al. | 369/77.2 |
| 4,710,910 | 12/1987 | Ejiri | 369/75.2 |
| 4,730,296 | 3/1988 | Urata et al. | 369/75.2 |
| 4,731,776 | 3/1988 | Ishii et al. | 369/77.2 |
| 4,758,909 | 7/1988 | Harase | 360/106 |
| 4,831,615 | 5/1989 | Goto et al. | 369/223 |
| 4,839,881 | 6/1989 | Takahara et al. | 369/75.2 |
| 4,918,553 | 4/1990 | Suzuki et al. | 360/99.06 |

Primary Examiner—Robert S. Tupper
Assistant Examiner—Allen Cao
Attorney, Agent, or Firm—Nixon & Vanderhye

[57] ABSTRACT

The present invention relates to a pickup carriage feeding apparatus of a disc player, comprising a driving motor, a pair of opposite racks connected to each other which are formed in parallel on the lower surface of the pickup carriage, a pair of driving gears mounted between the racks and respectively meshed with each of the racks, and a belt pulley in a coaxial connection with one of the gears for transmitting a driving force of the driving motor. Accordingly, the reliability of the disc player is enhanced since the feeding operation of the pickup carriage can be smoothly and stably attained with no moment or backlash.

1 Claim, 2 Drawing Sheets

PICKUP CARRIAGE FEEDING APPARATUS OF A DISC PLAYER

BACKGROUND OF THE INVENTION

1. Field of the Invention

The present invention relates to a pickup carriage feeding apparatus of a disc player, more particularly to a pickup carriage feeding apparatus of a disc player which enables a pickup carriage to be fed on two opposite rocks respectively meshed with two driving gears, one of which is connected through a belt pulley to a driving motor.

2. Description of the Prior Art

In general, a small-sized disc player, such as a mini disc player or a portable compact disc player, is designed to be easily carried.

Therefore, it is particularly required that the stability of a pickup carriage feeding apparatus be always maintained at any circumstance.

One such prior art pickup carriage feeding apparatus of a mini disc player is disclosed in U.S. Pat. No. 4,918,553, in which a guide shaft and a screw shaft are provided to be parallel to each other, with the pickup carriage being supported so as to be movable forward and backward along the guide shaft by the screw shaft, which is revolved by an driving motor.

U.S. Pat. No. 4,730,296 issued to Kazuo Urata, et al, discloses another type of pickup carriage feeding apparatus, in which the pickup carriage is mounted on a carriage base, two guide bars parallel to each other are supported with a guide bar ensuring portions on the lower surface of a chassis, and the carriage base is inserted into the guide bars connected to guide holes, which are formed in the carriage base.

In addition, a feed loading rack is formed on one side of the carriage base, the feed loading rack which is in mesh with a pinion moves the pickup carriage in a forward and backward directions in accordance with rotation directions of a driving motor. However, in such prior art, pickup experiences a large load arising from an increase of friction caused by meshing the teeth between a lead screw and a nut or the feed loading rack and the pinion.

There is still another problem in that a tracking error is caused by a backlash in the meshed teeth.

SUMMARY OF THE INVENTION

It is the object of the present invention to provide a pickup carriage feeding apparatus of a disc player which enables a pickup carriage to be fed smoothly and stably without moment or backlash in a feeding operation.

To accomplish the above object, in a pickup carriage feeding apparatus of a disc player wherein a pick-up carriage is guided by a guide bar when performing a feeding operation, the pickup carriage feeding apparatus of a disc player according to the present invention is constructed with a driving motor, a pair of opposite racks connected to each other which are formed in parallel on the lower surface of the pickup carriage, a pair of driving gears mounted between the racks and respectively meshed with each of the racks, and a belt pulley in a coaxial connection with one of the gears for transmitting a driving force of the driving motor.

In the pickup carriage feeding apparatus of a disc player, according to the present invention, when the driving force of a driving motor is transmitted through a belt pulley to a pair of gears, the gears, which are meshed with each other and respectively meshed with racks, make the pickup carriage travel in a forward or backward direction in accordance with the rotation direction of the driving motor.

Therefore, since the feeding operation of the pickup carriage can be smoothly and stably attained with no moment or backlash, the reliability of the disc player is enhanced.

DESCRIPTION OF THE PREFERRED EMBODIMENT

Figure 1:
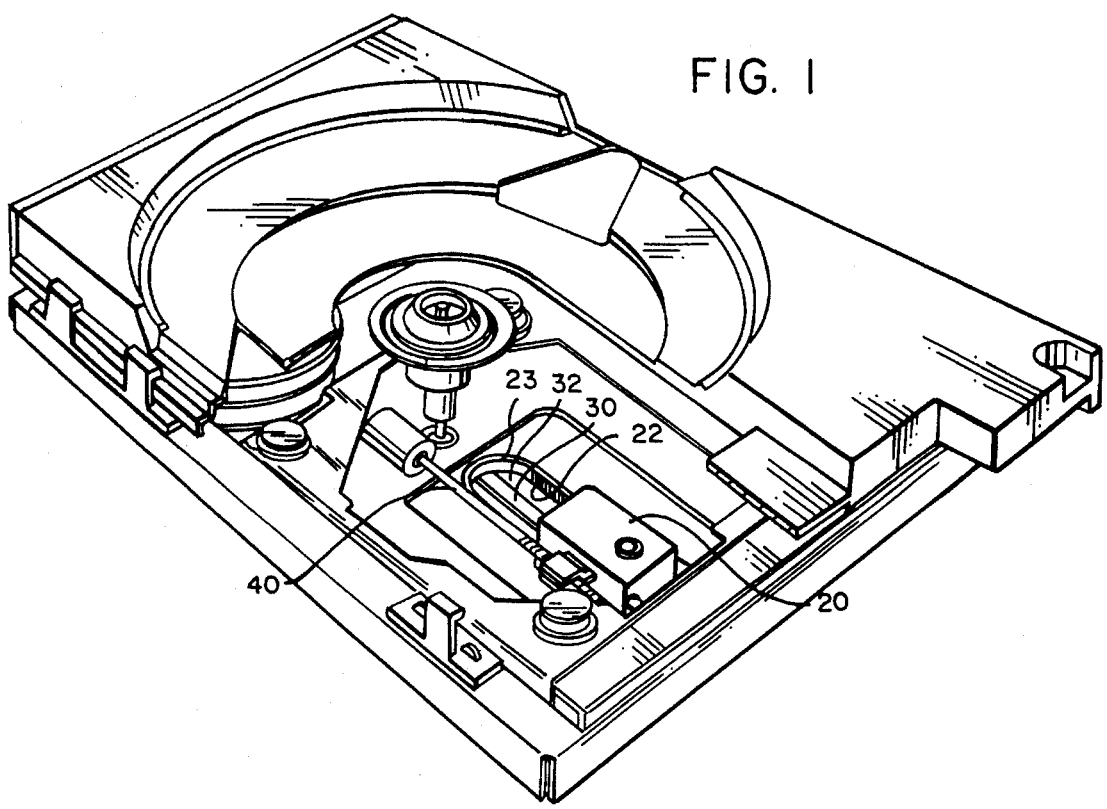
FIG. 1 is a schematic perspective of a disc player mounting a pickup carriage feeding apparatus according to the present invention.
Figure 2:
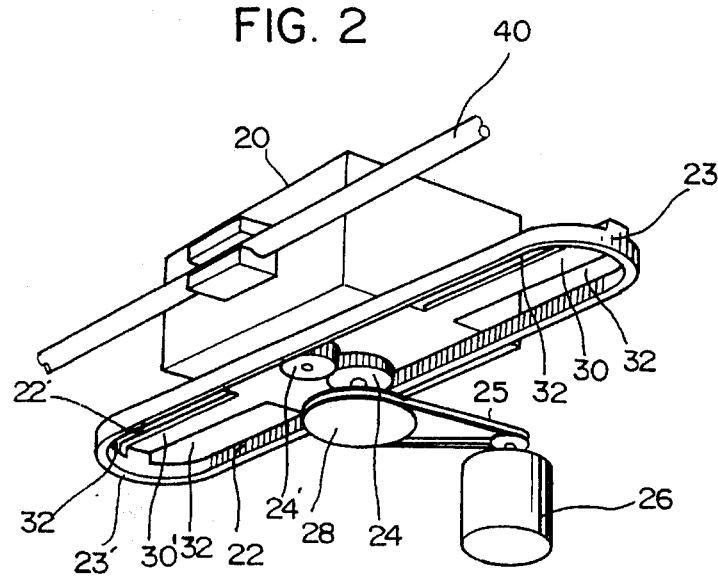
FIG. 2 is a perspective, viewed obliquely from the bottom, of a pickup carriage feeding apparatus according to the present invention.

FIG. 1 is a schematic perspective of a disc player mounting a pickup carriage feeding apparatus according to the present invention, and FIG. 2 is a perspective, viewed obliquely from the bottom, of a pickup carriage feeding apparatus according to the present invention. As shown in FIG. 1 and FIG. 2, in a pickup carriage feeding apparatus of a disc player wherein a pickup carriage is guided by a guide bar when performing a feeding operation, the pickup carriage feeding apparatus, according to the present invention, comprises a driving motor 26, a pair of opposite racks 22, 22' connected to each other which are formed in parallel on the lower surface of the pickup carriage 20, a pair of driving gears 24, 24' mounted between the racks 22, 22' and respectively meshed with each of the racks 22, 22', a belt pulley 28 in a coaxial connection with one of the gears 24, 24' for transmitting a driving force of the driving motor 26, the pair of racks 22, 22' are connected to be formed in an arch-shape 23, 23' (hereinafter, the parts formed in arch shape called "arch shape part") in their ends respectively and respective arch-shape parts 23, 23' are connected by rack supports 30, 30' to lower parts of two opposite sides of the pickup carriage 20 so that the arch-shape parts and the rack-supports are formed in one body.

And also, space 32 is provided between the racks 22, 22' and the rack supports 30, 30'.

The operations of the pickup carriage feeding apparatus according to the present invention will be described below with reference to FIG. 2, FIG. 3A and FIG. 3B.

Figure 3A:
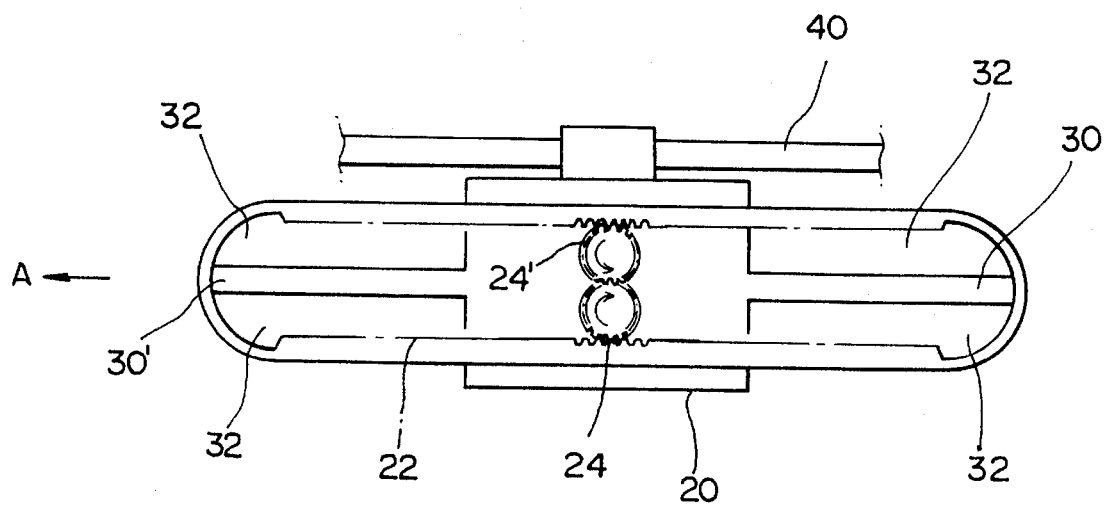
FIGS. 3A and 3B is a view for explaining operations of a pickup carriage feeding apparatus according to the present invention.

FIG. 3A and. FIG. 3B are views for explaining operations of a pickup carriage feeding apparatus according to the present invention.

As shown in FIG. 2 and FIG. 3A, when a driving motor 26 is driven in a clockwise direction, a driving force of the driving motor 26 is transmitted through a belt 25 to a belt pulley 28. At this time, a gear 24, which is in a coaxial connection with the belt pulley 28, is rotated in a clockwise direction in accordance with the rotated in a clockwise direction in accordance with the driven direction of the belt pulley 28, so that the other gear 24', meshed with the gear 24, is rotated in a counter clockwise direction. At this point, the racks 22, 22' respectively meshed with the gear 24, 24' start to move, so that the pickup carriage 20 begins to be fed in the arrow A direction along the guide bar 40 as shown in FIG. 3A.

Figure 3B:
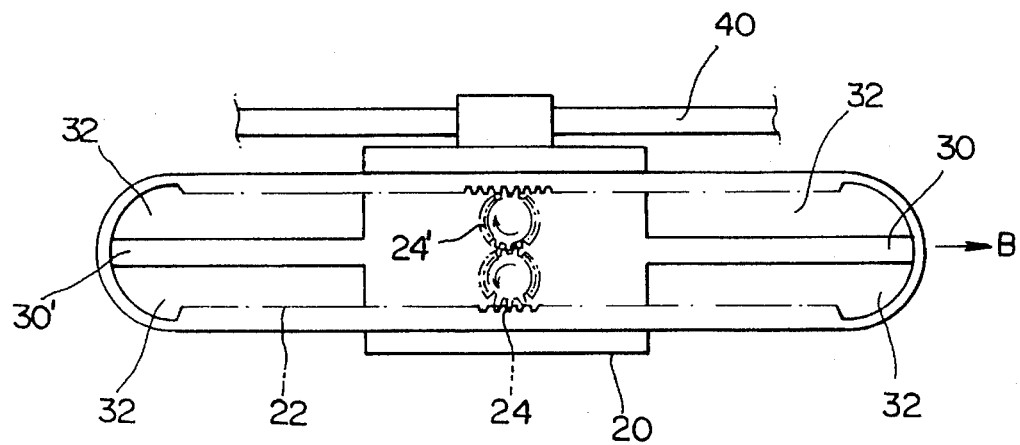

In the meantime, referring to FIG. 2 and FIG. 3B, when a driving motor 26 is driven in a counterclockwise direction, a driving force of the driving motor 26 is transmitted through a belt 25 to a belt pulley 28. At this time, a gear 24, which is in a coaxial connection with the belt pulley 28, is rotated in a counterclockwise direction in accordance with the driven direction of the belt pulley 28, so that the other gear 24', meshed with the gear 24, is rotated in a clockwise direction. At this point, the racks 22, 22' respectively meshed with the gear 24, 24' start to move, so that the pickup carriage 20 begins to be fed in the arrow B direction along the guide bar 40 as shown in FIG. 3B.

The length of the respective rocks 22, 22' is the same as that for the pickup carriage 20 to be travelled.

And also, the pickup carriages 20 is stably and smoothly fed with no moment or backlash since the rack 22, 22' exert an elastic force on the gears 24, 24' by the space 32, formed between the rack supports 30 and the racks 22, 22' when the gears 24, 24' are rotated in a meshed state with the racks 22, 22'.

As mentioned above, since a feeding operation of the pickup carriage can be smoothly and stably attained with no moment or backlash, the reliability of the disc player is enhanced.

What is claimed is:

1. A pickup carriage feeding apparatus of a disc player wherein a pickup carriage is guided by a guide bar when performing a feeding operation, the pickup carriage feeding apparatus comprising:

a driving motor;

a pair of opposite racks connected to each other which are formed in parallel on a lower surface of the pickup carriage, wherein the pair of racks are connected in an arch shape to form an arch shape part in their ends, respectively, and wherein the arch-shape parts in the ends of the racks are connected by rack supports to lower parts of two opposite sides of the pickup carriage that the arch-shape parts and the rack-supports are formed in one body;

a pair of driving gears located between the racks, the driving gears being meshed with each other and each of the driving gears being meshed with each of the racks; and a belt pulley in coaxial connection with one of the gears, the belt pulley being connected to the driving motor through a belt for transmitting a driving force of the driving motor, space is provided between the rack supports and the racks to exert an elastic force on the driving gears during the feeding operation in order to prevent a backlash in the feeding operation.

\* \* \* \* \*